United States Patent
Bachleitner et al.

(10) Patent No.: US 8,747,647 B2
(45) Date of Patent: Jun. 10, 2014

(54) PROCESS AND APPARATUS FOR THE ELECTROLYSIS OF AN AQUEOUS SOLUTION OF HYDROGEN CHLORIDE OR ALKALI CHLORIDE IN AN ELECTROLYTIC CELL

(75) Inventors: Walter Bachleitner, Wels (AT); Christoph Erdmann, Hofheim (DE); Joachim Rohovec, Baden Bei Wien (AT); Andreas Bulan, Langenfled (DE); Mathias Weis, Leverkusen (DE)

(73) Assignees: Messer Group GmbH, Sulzbach (DE); Bayer Material Science AG, Leverkusen (DE)

( * ) Notice: Subject to any disclaimer, the term of this patent is extended or adjusted under 35 U.S.C. 154(b) by 78 days.

(21) Appl. No.: 13/375,327

(22) PCT Filed: May 28, 2010

(86) PCT No.: PCT/EP2010/003253
§ 371 (c)(1),
(2), (4) Date: Dec. 23, 2011

(87) PCT Pub. No.: WO2010/139425
PCT Pub. Date: Sep. 12, 2010

(65) Prior Publication Data
US 2012/0085659 A1    Apr. 12, 2012

(30) Foreign Application Priority Data
May 30, 2009   (DE) .......................... 10 2009 023 539

(51) Int. Cl.
*C25B 1/26* (2006.01)
*C25B 1/46* (2006.01)
*C25B 15/08* (2006.01)
*H01M 8/04* (2006.01)

(52) U.S. Cl.
CPC . *C25B 15/08* (2013.01); *C25B 1/46* (2013.01); *C25B 1/26* (2013.01); *H01M 8/04097* (2013.01)
USPC ........... 205/618; 205/515; 205/526; 204/237; 204/266; 429/415

(58) Field of Classification Search
None
See application file for complete search history.

(56) References Cited

U.S. PATENT DOCUMENTS 4,312,720 A * 1/1982 Lefevre .......................... 205/516
4,329,158 A * 5/1982 Sircar ................................ 95/26

(Continued)

FOREIGN PATENT DOCUMENTS

| DE | 103 42 148 A1 | 4/2005 |
| EP | 1 067 215 A1 | 1/2001 |
| EP | 1 120 481 A1 | 8/2001 |

*Primary Examiner* — Harry D Wilkins, III
(74) *Attorney, Agent, or Firm* — Laurence A. Greenberg; Werner H. Stemer; Ralph E. Locher

(57) ABSTRACT

In a process for chlorine-alkali electrolysis, use is made of an oxygen depletion cathode. The process is run with a high excess of oxygen. The oxygen needed for this is provided for a device of the gas separation, for example a VPSA plant or an air fractionation plant. The large quantities of oxygen produced lead to considerable costs of the process. According to the invention, the oxygen-rich atmosphere remaining after passing through the process is fed back into the device for gas separation as input gas. The device the gas separation is therefore operated with an oxygen-rich input gas and therefore produces a larger quantity of oxygen-rich gas, which in turn is fed to the oxygen depletion cathode. As a result of the circulation of the gas, the economy of the overall process is increased considerably.

6 Claims, 1 Drawing Sheet

(56) References Cited

U.S. PATENT DOCUMENTS

| | | | |
|---|---|---|---|
| 4,560,397 A | * | 12/1985 | Cheung .......................... 62/652 |
| 5,079,103 A | * | 1/1992 | Schramm ...................... 429/411 |
| 5,175,061 A | * | 12/1992 | Hildebrandt et al. ......... 429/408 |
| 5,770,035 A | | 6/1998 | Faita |
| 6,402,929 B1 | | 6/2002 | Sakata et al. |
| 6,488,833 B1 | | 12/2002 | Sakata et al. |
| 6,921,597 B2 | * | 7/2005 | Keefer et al. ................. 429/415 |
| 7,658,835 B2 | | 2/2010 | Gestermann et al. |

* cited by examiner

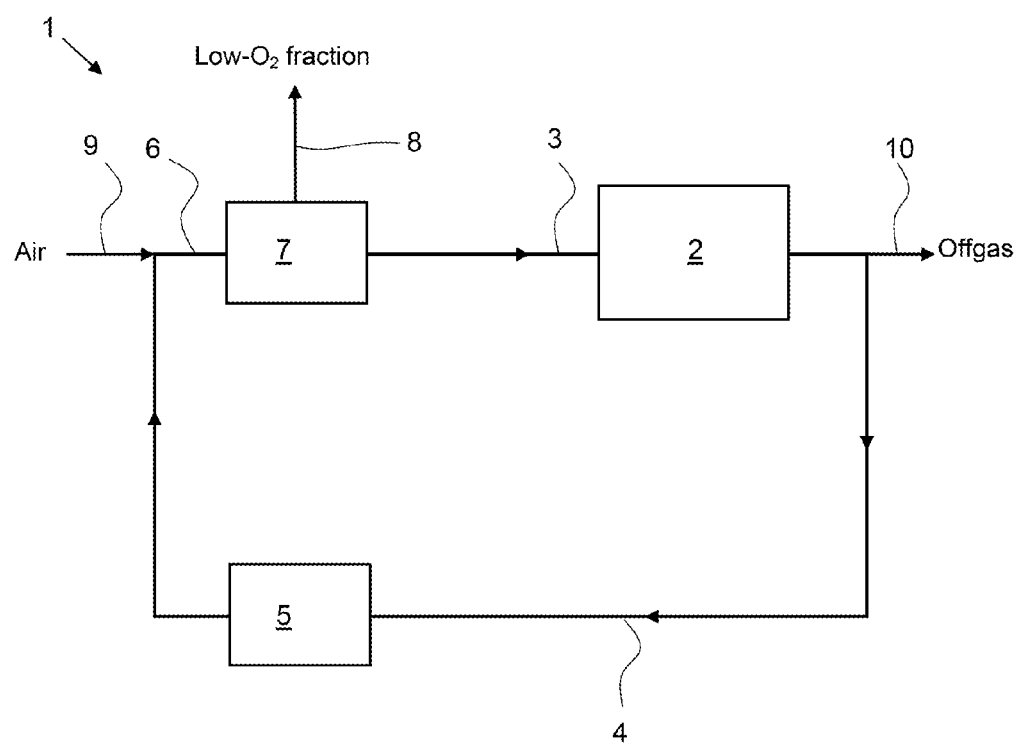

PROCESS AND APPARATUS FOR THE ELECTROLYSIS OF AN AQUEOUS SOLUTION OF HYDROGEN CHLORIDE OR ALKALI CHLORIDE IN AN ELECTROLYTIC CELL

BACKGROUND OF THE INVENTION

Field of the Invention

The invention relates to a process for the electrolysis of an aqueous solution of hydrogen chloride or alkali metal chloride in an electrolysis cell which comprises an anode half element having an anode, a cathode half element having a gas diffusion electrode as cathode and a cation-exchange membrane for electrolytically separating anode half element and cathode half element, where an oxygen-containing gas is fed to the cathode half element and excess oxygen-containing gas is discharged from the cathode half element. The invention further relates to a corresponding apparatus.

The electrolysis of aqueous solutions of hydrogen chloride (hydrochloric acid) and aqueous alkali metal chloride solutions can be carried out electrolytically using a gas diffusion electrode as oxygen-consuming cathode. Here, oxygen, air or oxygen-enriched air is fed in excess into the cathode space of the electrolysis cell. The use of oxygen-consuming cathodes reduces the electrolysis voltage by about 30% compared to conventional hydrochloric acid or chloralkali electrolyses. The oxygen-rich gas fed to the cathode half element, i.e., for example, pure oxygen, air or oxygen-enriched air, will hereinafter also be referred to as oxygen without this constituting a restriction of the invention.

A process for the electrolysis of hydrochloric acid is known, for example, from U.S. Pat. No. 5,770,035. The subject matter described there has a membrane electrolysis cell having an oxygen-consuming cathode and an anode space having an anode suitable for the generation of chlorine, with the two being separated from one another by a conventional cation-exchange membrane. The anode space is filled with hydrochloric acid. Chlorine is formed at the anode and is collected and worked up, while air, oxygen-rich air or oxygen is fed to the cathode.

EP-A 1 067 215 discloses a process for the electrolysis of an aqueous alkali metal chloride solution using an oxygen-consuming cathode. The electrolysis cell is made up of an anode half element and a cathode half element which are separated from one another by a cation-exchange membrane. The cathode half element consists of an electrolyte space and a gas space between which an oxygen-consuming cathode is arranged. The electrolyte space is filled with alkali metal hydroxide solution. During the electrolysis, the gas space is supplied with oxygen.

When oxygen-consuming cathodes are used, hydrogen can be formed as a result of competing reactions. Circulation of the excess oxygen present in the cathode half element has hitherto failed for this reason, since recycling produces a risk of the hydrogen present together with oxygen in the gas mixture being concentrated to above the explosion limit of 4% by volume. The excess gas has therefore hitherto mostly been purified and discharged into the exhaust air.

To solve the problem of the concentration of hydrogen being increased, DE 103 42 148 A1 proposes subjecting the oxygen-rich offgas discharged from the cathode half element to catalytic oxidation of hydrogen. The gas which has been treated in this way is subsequently fed back to the cathode half element. To make an excess of oxygen always available, additional oxygen is fed to the cathode half element. The freshly introduced oxygen is, for example, mixed with the purified oxygen stream before entry into the cathode half element. The catalytic reaction appreciably reduces the hydrogen content and makes multiple recycling of the oxygen possible. This mode of operation has been found to be useful, but suffers from the problem that any further gases such as argon which cannot be removed catalytically accumulate during circulation and make increased replacement by fresh oxygen necessary. To ensure a sufficient oxygen excess at the cathode, pure oxygen ideally has to be introduced, and this is comparatively expensive.

BRIEF SUMMARY OF THE INVENTION

It is an object of the present invention to provide an alternative process which allows at least partial circulation of the oxygen used in excess in the cathode half element.

This object is achieved in a process of the type and intended purpose mentioned at the outset by the oxygen-containing gas taken off from the cathode half element being at least partly fed to a gas separation apparatus in which the oxygen-containing gas is separated into an oxygen-rich fraction and a low-oxygen fraction and the oxygen-rich fraction subsequently being fed to the cathode half element. In the gas separation apparatus, the gas taken off from the cathode half element is fractionated in a manner known per se. In this way, the introduction of fresh oxygen can be significantly reduced and the costs can thereby be lowered. Only a very small proportion of trace gases such as hydrogen or argon is obtained in the oxygen-rich fraction in the gas separation apparatus, since these trace gases, like any nitrogen present, are separated off as a joint fraction or a plurality of separate fractions in the gas separation apparatus. Likewise, the invention does not rule out providing an additional process step for the removal, for example catalytic removal, of trace gases, in particular of hydrogen or argon.

Here, the "oxygen-rich gas" which is supplied to oxygen-consuming cathode at the inlet side is preferably a gas having an oxygen content of at least 90% by volume. A gas mixture containing "excess oxygen" is generally a gas which has an oxygen content higher than that of air. Although the oxygen content of the gas in the cathode space is reduced by the electrolysis process at the oxygen-consuming cathode, the oxygen content at the outlet side is, for example, 70-85% by volume and thus still far higher than the oxygen content of air. This gas containing excess oxygen is, according to the invention, fed in its entirety or partly to the gas separation apparatus with the result that the latter produces a correspondingly greater stream of oxygen-rich fraction.

The gas separation apparatus advantageously operates as a membrane process, an adsorption process or a cryogenic gas separation process, for example air fractionation by rectification. The separation processes preferably operate in such a way that any traces of further gases such as argon or hydrogen which are present in the oxygen-containing gas taken off from the cathode half element are separated off from the oxygen-rich fraction. In this way, the gas can be recycled significantly more often than is possible in processes according to the prior art.

The object of the invention is also achieved by an apparatus for the electrolysis of an aqueous solution of hydrogen chloride or alkali metal chloride in an electrolysis cell which comprises an anode half element having an anode, a cathode half element having a gas diffusion electrode as cathode and a cation-exchange membrane for electrolytically separating anode half element and cathode half element, an oxygen inlet for feeding an oxygen-rich gas to the cathode half element and an oxygen outlet for discharging excess oxygen-containing gas from the cathode half element and is characterized in that the oxygen outlet is connected so as to allow flow to a gas separation apparatus in which the oxygen-containing gas is separated into an oxygen-rich fraction and a low-oxygen fraction, where the gas separation apparatus comprises an outlet line for the oxygen-rich fraction which is connected so as to allow flow to the oxygen inlet of the cathode half element.

As preferred gas separation apparatuses, it is possible to use, in particular, a pressure swing adsorption plant (PSAP), a vacuum pressure swing adsorption plant (VPSAP) or a cryogenic air fractionation plant (CAFP). Such apparatuses have been known for a long time and make it possible to reliably produce an oxygen-rich fraction having an oxygen content of >90% by volume (PSAP; VPSAP) and >99.998% by volume in the case of cryogenic air fractionation plants from fed-in air. When a gas which has an oxygen content higher than that of air is fed in, the purity increases further and the economics of the plant in respect of oxygen production are improved.

BRIEF DESCRIPTION OF THE SEVERAL VIEWS OF THE DRAWING

An illustrative embodiment of the invention will be described in more detail with the aid of the drawing. The single drawing (FIG. 1) schematically shows the mode of operation of an arrangement according to the invention.

DESCRIPTION OF THE INVENTION

The arrangement 1 for the electrolysis of an aqueous solution of hydrogen chloride or an aqueous alkali metal chloride solution comprises an electrolysis cell which comprises, apart from an anode half element which is not shown here, a cathode half element having an oxygen-consuming cathode 2 (hereinafter also referred to as OCC for short). To operate the OCC, an oxygen-rich gas, for example oxygen having a purity of over 90%, is fed in via a feed line 3. In the electrolysis process, the oxygen content of the gas present in the gas space of the cathode half element is reduced to a value which is still significantly above the oxygen content of air. This gas containing excess oxygen is worked up in the manner described below and circulated. For this purpose, the gas containing excess oxygen is discharged from the cathode half space via a discharge line 4. The discharge line 4 opens, optionally after going through a catalytic separation apparatus 5 for separating off hydrogen, into the inlet line 6 of a gas separation apparatus 7. The apparatus 7 is, for example, an adsorption plant of the PSA or VPSA type, or a cryogenic air fractionation plant. The gas separation apparatus 7 fractionates the gas stream fed in via inlet line 6 to give an oxygen-rich fraction and one or more low-oxygen fraction(s) which contain, for example, nitrogen, argon or other noble gases, carbon dioxide or hydrogen. While the low-oxygen fraction or low-oxygen fractions is or are removed from the circuit via an offgas line 8 and may be passed to another use, the oxygen-rich fraction is fed into the feed line 3 and again supplied 3 to the OCC, thus closing the circuit. An oxygen-containing gas, for example air or pure oxygen, is introduced via a fresh gas feed line 9 in order to replace the electrolytically consumed oxygen. An offgas line 10 serves, if required, to take gas containing excess oxygen from the circuit, for example in order to counter accumulation of trace gases in the circuit.

Apart from the preparation of chlorine, the use of gas diffusion electrodes as oxygen-consuming cathodes can also be useful in other electrolytic processes, for example in the preparation of hydrogen peroxide ($H_2O_2$).

EXAMPLE

An oxygen-rich fraction which has been separated off in a PSA plant for gas separation and has an oxygen content of 93% by volume (1345 kg/h) is fed into the cathode space of an oxygen-consuming cathode which is arranged according to the invention in an oxygen circuit connected to the PSA plant. The electrolysis process reduces the oxygen content of the gas present in the cathode space to 85% by volume. A stream containing about 500 kg/h of oxygen is taken off from this gas and mixed with 940 kg/h of $O_2$ from fresh air. The resulting mixed gas containing about 28% by volume of oxygen (1440 kg/h of $O_2$) is separated in the PSA plant into a low-oxygen fraction and an oxygen-rich fraction. The low-oxygen fraction which has an oxygen content of about 9.0% by volume (95 kg/h of $O_2$) and comprises mainly nitrogen is discharged and, after a purification stage, released into the surrounding air or passed to another use. To keep the hydrogen content of the circulating gas continually at a value significantly below the explosion limit, further gas is taken off from the circuit at any point in an amount which can be regulated as a function of the hydrogen content. In general, a proportion of less than 8-10% of the gas being circulated suffices for this purpose and has to be replaced by fresh air or oxygen. As an alternative or in addition to the discharge of a substream, the hydrogen can also be removed catalytically.

LIST OF REFERENCE NUMERALS

1. Arrangement
2. Oxygen-consuming cathode/OCC
3. Feed line
4. Discharge line
5. Catalytic separation apparatus
6. Inlet line
7. Gas separation apparatus
8. Offgas line
9. Fresh gas feed line
10. Offgas line

The invention claimed is:
1. A process for the electrolysis of an aqueous solution of hydrogen chloride or alkali metal chloride in an electrolysis cell, which comprises:
   providing an anode half element having an anode, a cathode half element having a gas diffusion electrode as a cathode and a cation-exchange membrane for electrolytically separating the anode half element and the cathode half element,
   feeding an oxygen-containing gas to the cathode half element and discharging gas containing excess oxygen from the cathode half element, and
   at least partly feeding the gas containing excess oxygen taken off from the cathode half element to a gas separation apparatus in which the gas containing excess oxygen is separated into an oxygen-rich fraction and a low-oxygen fraction and the oxygen-rich fraction is subsequently fed to the cathode half element.
2. The process as claimed in claim 1, wherein the gas separation apparatus operates according to a membrane process, an adsorption process or a cryogenic gas separation process.

3. The process as claimed in claim 1, which further comprises separating off trace gases such as hydrogen or argon from the oxygen rich fraction using the gas separation apparatus.

4. An apparatus for the electrolysis of an aqueous solution of hydrogen chloride or alkali metal chloride in an electrolysis cell, which comprises:
  an anode half element having an anode,
  a cathode half element having a gas diffusion electrode as a cathode,
  a cation-exchange membrane for electrolytically separating the anode half element and the cathode half element,
  an oxygen inlet for feeding an oxygen-rich gas to the cathode half element,
  an oxygen outlet for discharging gas containing excess oxygen from the cathode half element, and
  a gas separation apparatus,
  the oxygen outlet is connected so as to allow flow to the gas separation apparatus in which the oxygen-containing gas is separated into an oxygen-rich fraction and a low-oxygen fraction and the gas separation apparatus is equipped with an outlet line for the oxygen-rich fraction which is connected so as to allow flow to the oxygen inlet of the cathode half element.

5. The apparatus as claimed in claim 4, wherein a pressure swing adsorption plant, a vacuum pressure swing adsorption plant or a cryogenic air fractionation plant is used as gas separation apparatus.

6. The apparatus as claimed in claim 4, wherein the gas separation apparatus separates off trace gases such as hydrogen or argon from the oxygen rich fraction.

\* \* \* \* \*